(12) United States Patent
Omokawa et al.

(10) Patent No.: US 7,209,637 B2
(45) Date of Patent: Apr. 24, 2007

(54) IMAGE REPRODUCING APPARATUS HAVING SKIP FUNCTION

(75) Inventors: Mitsunori Omokawa, Kawasaki (JP); Hideo Kataoka, Tokyo (JP); Kazuya Fujita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1084 days.

(21) Appl. No.: 09/986,200

(22) Filed: Nov. 7, 2001

(65) Prior Publication Data

US 2002/0126989 A1 Sep. 12, 2002

(30) Foreign Application Priority Data

Nov. 8, 2000 (JP) .............................. 2000-340955

(51) Int. Cl.
  *H04N 5/76* (2006.01)
(52) U.S. Cl. ......................................... 386/69; 386/70
(58) Field of Classification Search ............. 369/47.11, 369/53.37, 30.03; 386/6–8, 68–70, 45, 125–126
See application file for complete search history.

(56) References Cited

U.S. PATENT DOCUMENTS

| 6,075,919 | A | 6/2000 | Omoto et al. |
| 6,205,427 | B1 * | 3/2001 | Itoh et al. .................... 704/260 |
| 6,262,951 | B1 * | 7/2001 | Shimizu et al. ............ 369/30.1 |
| 2002/0037152 | A1 | 3/2002 | Kato et al. |

FOREIGN PATENT DOCUMENTS

| EP | 0 929 072 A2 | 7/1999 |
| EP | 0 935 395 A2 | 8/1999 |
| JP | 2001-256694 | 9/2001 |
| JP | 2001-320674 | 11/2001 |
| JP | 2002-112197 | 4/2002 |

OTHER PUBLICATIONS

Japanese Office Action (Explanation of Circumstances concerning Accelerated) dated Jul. 22, 2004 for Patent Application No. 2000-340955.
Search Report, dated Mar. 31, 2004 from the European Patent Office for Application No. 01126439.7-1241-.

* cited by examiner

*Primary Examiner*—Thai Q. Tran
*Assistant Examiner*—Nigar Chowdhury
(74) *Attorney, Agent, or Firm*—Pillsbury Winthrop Shaw Pittman, LLP

(57) ABSTRACT

An image reproducing apparatus reproducing image information, having a reproduction processor reproducing the image information stored in the recording medium, a key input section having a skip key, a first skip processor, when the skip key is pressed one time, skipping the reproduction of the image information by the reproduction processor for a first predetermined period and resuming the reproduction of the image information by the reproduction processor after the first predetermined period is passed, and a second skip processor, when the skip key is pressed twice in a certain period, skipping the reproduction for a second predetermined period having the first predetermined period and a third predetermined period which is longer than the first predetermined period and resuming the reproduction of the image information by the reproduction processor after the second predetermined period is passed.

3 Claims, 2 Drawing Sheets

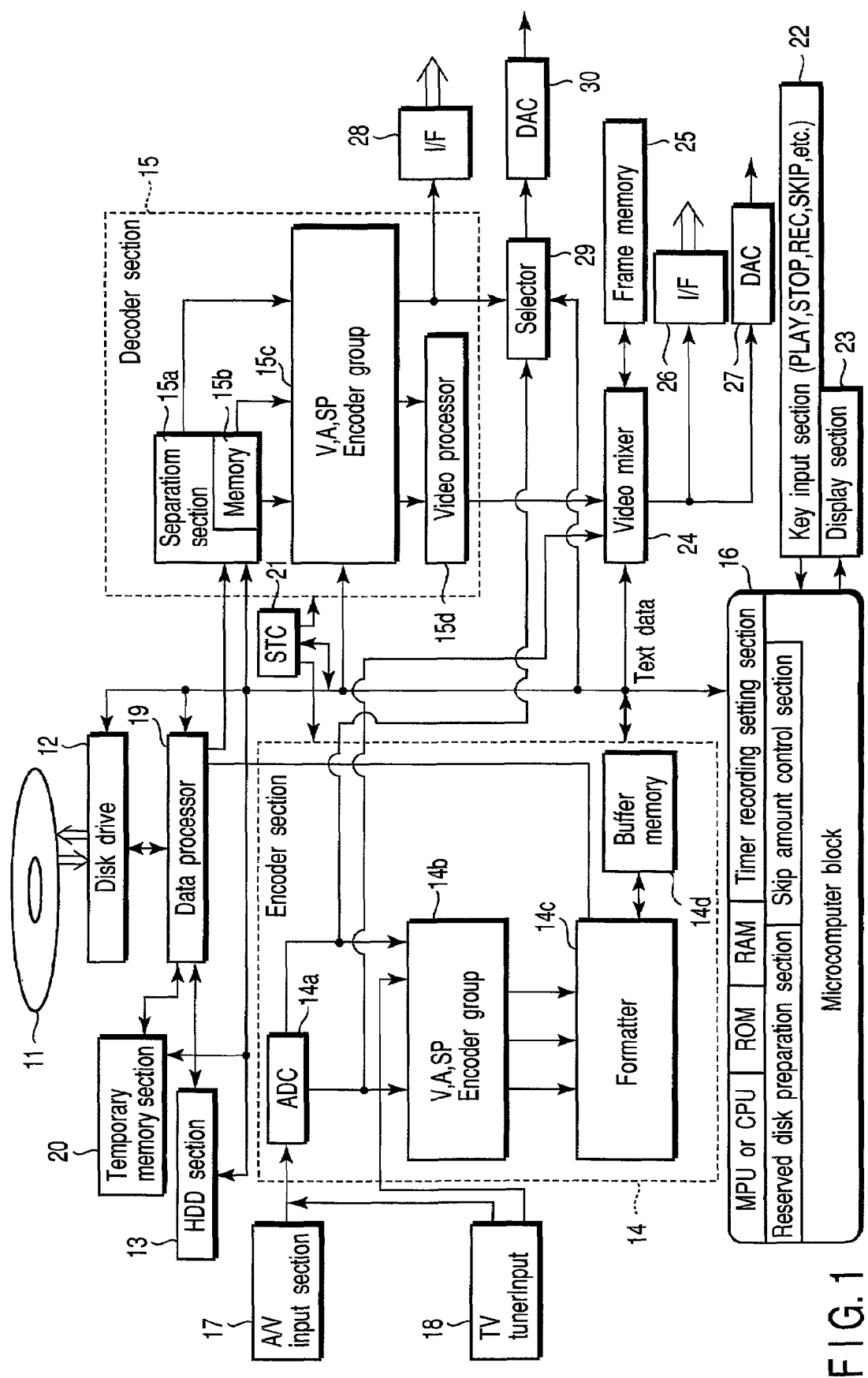
F I G. 1

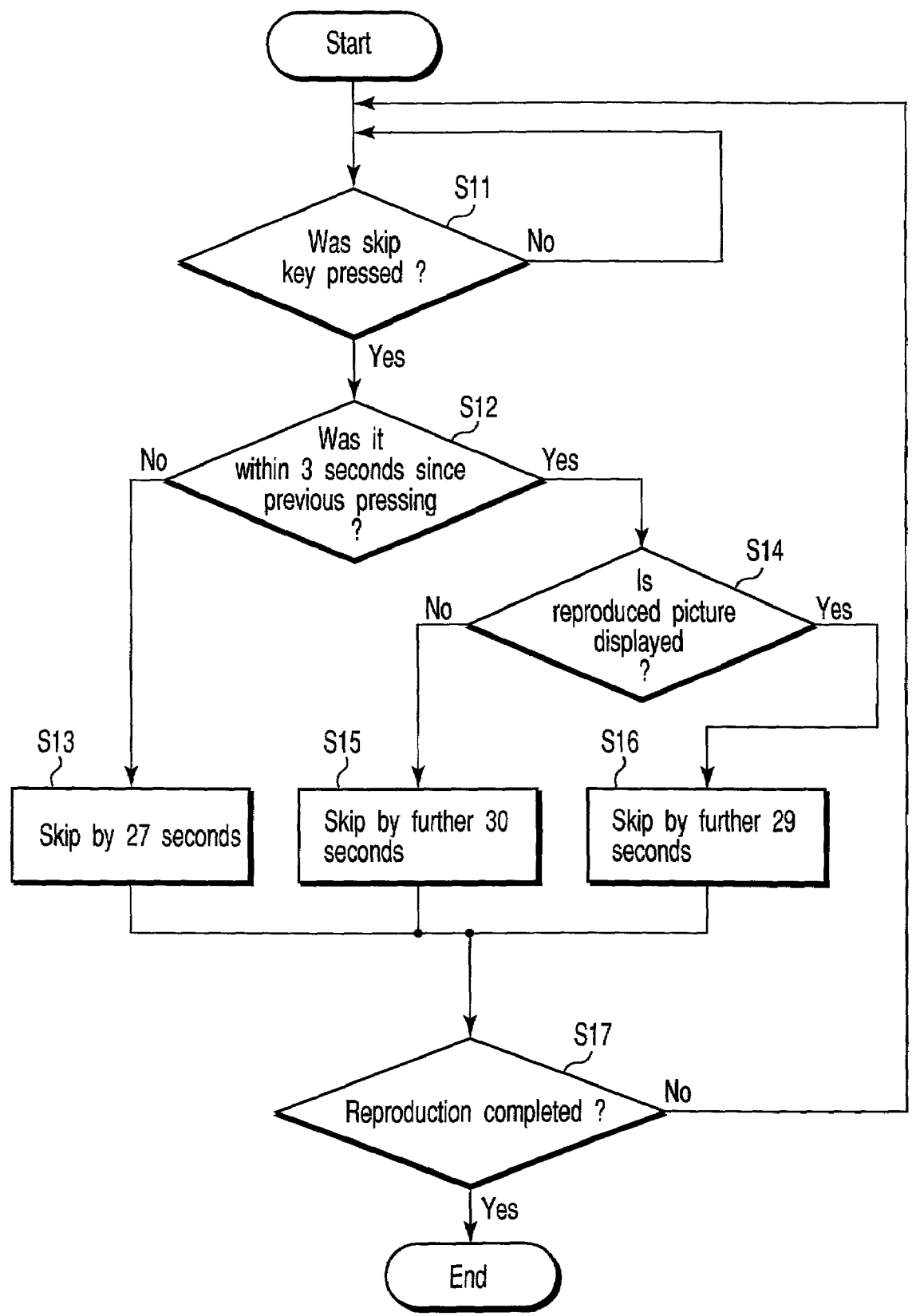
F I G. 2

IMAGE REPRODUCING APPARATUS HAVING SKIP FUNCTION

CROSS-REFERENCE TO RELATED APPLICATIONS

This application is based upon and claims the benefit of priority from the prior Japanese Patent Application No. 2000-340955, filed Nov. 8, 2000, the entire contents of which are incorporated herein by reference.

BACKGROUND OF THE INVENTION

1. Field of the Invention

The present invention relates to an improvement of a skip function of an image reproducing apparatus, which can handle a recording medium detachable with respect to the device such as an optical disk, and a recording medium built in the device such as hard disk, at the same time.

2. Description of the Related Art

As is well known, there has recently been developed an image reproducing apparatus that can handle a recording medium detachable with respect to the device, for example, an optical disk such as DVD (Digital Versatile Disc)-RAM (Random Access Memory) and DVD-RW (Re Writable), and a recording medium built in the device such as hard disk, having high-speed recording and reproduction speed and a large capacity, at the same time.

This type of image reproducing apparatus inherently has a possibility of providing users various new functions, which have never been realized with a conventional reproducing apparatus, by organically uniting an advantage that the optical disk has and an advantage that the hard disk has. Hence, it is currently strongly desired to improve this type of image reproducing apparatus in fine details, so that it becomes more convenient and there is no problem.

For example, at the time of recording and reproducing a TV program or the like in a recording medium, there is generally used a skip function in which commercial portions included in the picture such as this TV program or the like are skipped, at the time of reproduction, with one skip key operation, for example, in a VTR (video tape recorder). It is a function that utilizes the fact that the time required for commercials is normally in a unit of 15 seconds or 30 seconds, and for example, in order to skip a commercial time of 90 seconds, by pressing the skip key three times, a skip of 90 seconds, which is three times as long as 30 seconds, is performed. As a result, it becomes possible to watch a movie or the like without being interrupted by a commercial or the like, with a simple skip key operation.

In the case where there is a commercial during reproduction of a TV program, however, if a user notices that there is a commercial, and performs this skip key operation of this skip function, there is generally an operation delay of several seconds. As a result, there is a problem in that the timing of the TV program to be reproduced after the skip causes a delay of several seconds.

BRIEF SUMMARY OF THE INVENTION

In view of the above situation, it is an object of the present invention to provide an image reproducing apparatus that can handle a recording medium detachable with respect to the device, and a large-capacity recording medium built in the apparatus, at the same time, wherein the apparatus has a function of performing a skip for the time obtained by subtracting the delay time in the user's operation, particularly for the first skip time, with respect to the skip function of commercials at the time of reproducing the picture.

In order to solve the above problems, the present invention is an image reproducing apparatus reproducing image information from a recording medium, comprising: a reproduction processor reproducing the image information stored in the recording medium; a key input section having a skip key; a first skip processor, when the skip key is pressed one time, skipping the reproduction of the image information by the reproduction processor for a first predetermined period and resuming the reproduction of the image information by the reproduction processor after the first predetermined period is passed; and a second skip processor, when the skip key is pressed twice in a certain period, skipping the reproduction of the image information by the reproduction processor for a second predetermined period having the first predetermined period and a third predetermined period which is longer than the first predetermined period and resuming the reproduction of the image information by the reproduction processor after the second predetermined period is passed.

With the present invention having such a construction, a first predetermined period of time is set, with the first operation of pressing the skip key for the skip function, taking into consideration the time until the user recognizes that a commercial has started and the time until the user takes a remote control, and a second predetermined period of time is set, not including such time, with the skip key pressing operation of the second time and after. Thereby, for example, with respect to a commercial of 30 seconds, a skip for 25 seconds is performed, and with the second pressing of the skip key with respect to a commercial of 60 seconds, a skip for 25 seconds+30 seconds, in total, for 55 seconds is performed, so that a skip processing is performed, taking into consideration the delay time in operation by the user. As a result, it becomes possible to avoid such a problem that a skip is performed to a point of time after a certain period of time has passed since the main program resumed, which tends to happen with the conventional device.

BRIEF DESCRIPTION OF THE SEVERAL VIEWS OF THE DRAWING

FIG. 1 is a block diagram for explaining one embodiment of an image reproducing apparatus according to the present invention; and FIG. 2 is a flowchart showing a procedure for determining the skip time of the skip function of the image reproducing apparatus according to the present invention.

DETAILED DESCRIPTION OF THE INVENTION

One embodiment of the present invention will now be described with reference to the drawings. FIG. 1 shows the schematic construction of one embodiment of the image reproducing apparatus according to the present invention.

[Construction of Image Reproducing Apparatus]

That is to say, this image reproducing apparatus comprises, as main constituents, a disk drive 12 which rotates an optical disk 11 such as a DVD-RAM or a DVD-RW and can execute write and read of information with respect to this optical disk 11; an HDD (Hard Disc Drive) section 13 which rotates a hard disk (not shown) and can execute write and read of information with respect to the hard disk; an encoder section 14 constituting the recording side; a decoder section 15 constituting the reproduction side; and a microcomputer block 16 supervisingly controlling the operation of the device body.

The encoder section 14 comprises an ADC (Analog to Digital Converter) 14a, an encoder group 14b including a V (Video) encoder, an A (Audio) encoder and an SP (Sub-Picture) encoder, a formatter 14c for converting the output of each encoder of this encoder group 14b into a predetermined format, and a buffer memory 14d used for the operation of this formatter 14c.

Of these, to the ADC 14a are input an external analog picture signal+an external analog speech signal from an A/V (Audio/Video) input section 17, or an external analog picture signal+external analog speech signal from a TV (Television) tuner 18.

The ADC 14a digitizes the input analog picture signal, for example, at a sampling frequency of 13.5 MHz and with a quantization bit number of 8 bits. That is to say, the luminance element Y, the color-difference element Cr (or Y-R) and the color-difference element Cb (or Y-B) are quantized with 8 bits, respectively.

Similarly, the ADC 14a digitizes the input analog speech signal, for example, at a sampling frequency of 48 kHz and with a quantization bit number of 16 bits.

When a digital picture signal and a digital speech signal are input to the ADC 14a, the ADC 14a lets the digital picture signal and the digital speech signal pass through.

It is allowed to perform fluctuation reduction processing or sampling rate change processing, without modifying the content, with respect to these digital picture signal and digital speech signal.

The digital picture signal output from the ADC 14a is transmitted to the formatter 14c via the V encoder in the encoder group 14b. The digital speech signal output from the ADC 14c is transmitted to the formatter 14c via the A encoder in the encoder group 14b.

The V encoder has a function of converting the input digital picture signal to a digital picture signal compressed at a variable bit rate, based on the MPEG (Moving Picture Image Coding Experts Group) 2 or the MPEG1 standard.

The A encoder has a function of converting the input digital speech signal to a digital speech signal compressed at a fixed bit rate, or a digital speech signal of a linear PCM (Pulse Code Modulation), based on the MPEG or the AC (Audio Compression)-3 standard.

In the case where a sub-picture (SP) signal is input from the A/V input section 17 (for example, a signal from a DVD video player with an independent output terminal of a sub-picture signal), or in the case where the DVD video signal having such a data construction is broadcasted, which is received by the TV tuner 18, then the sub-picture signal in the DVD video signal is input to the SP encoder in the encoder group 14b. The sub-picture signal input to this SP encoder is arranged in a predetermined signal format and transmitted to the formatter 14c.

The formatter 14c performs predetermined signal processing with respect to the input digital picture signal, digital speech signal and sub-picture signal, so that these have a format suitable for recording, respectively, while using the buffer memory 14d as a work area, and outputs these signals to a data processor 19.

The information encoded in the encoder section 14 and the prepared control information can be recorded in the optical disk 11, via the data processor 19 and the disk drive 12.

Here, this image reproducing apparatus may supply the information encoded in the encoder section 14 and the prepared control information, as described above, to the HDD section 13 via the data processor 19, to be recorded in the hard disk.

Moreover, the information recorded in the hard disk can be read by the HDD section 13, and recorded in the optical disk 11 via the data processor 19 and the disk drive 12.

In this case, if the format of the information recorded in the hard disk is the same as the data format of the optical disk 11, the information read from the hard disk is directly recorded in the optical disk 11.

If the format of the information recorded in the hard disk is different from the data format of the optical disk 11, the information read from the hard disk is supplied to the encoder section 14, and the information is subjected to the encode processing so as to become adaptable to the data format of the optical disk 11, and then recorded in the optical disk 11.

This image reproducing apparatus comprises a disk drive 12 having an optical system and a drive system, a data processor 19, a temporary memory section 20, and STC (System Time Counter or System Time Clock) 21, as a section for executing write and read (recording and reproduction) of the information.

Of these, the temporary memory section 20 is utilized for buffering a certain amount of data output from the encoder section 14 and written in the optical disk 11 via the data processor 19 and the disk drive 12, or for buffering a certain amount of data read from the optical disk 11 by the disk drive 12 and input to the decoder section 15 via the data processor 19.

The data processor 19 supplies data for recording output from the encoder section 14 to the disk drive 12, takes in the data read from the optical disk 11 by the disk drive 12, rewrites the control information recorded in the optical disk 11, and deletes the data recorded in the optical disk 11, based on the control of the microcomputer block 16.

Here, the microcomputer block 16 includes an MPU (Micro Processing Unit) [or CPU (Central Processing Unit)], a ROM in which the control program is written, and a RAM (Random Access Memory) for providing a work area necessary for executing the program.

The MPU in the microcomputer block 16 receives the operation information from the key input section 22 such as an operation panel or a remote control, and uses the RAM as a work area to supervisingly control the operation of the whole device, based on the control program stored in the ROM.

Of the operation executed by the microcomputer block 16, the control related to the characteristic portion of the invention includes setting of timer recording and setting of just recording. Setting of just recording includes setting of the compression encoding rate of the recorded data and detection of the remaining recording capacity of the optical disk 11 and the hard disk.

Of the execution results of the microcomputer block 16, the content to be informed to the user is displayed on the display section 23, or OSD (On Screen Display)-displayed on a monitor display (not shown).

The timing at which the microcomputer block 16 controls the disk drive 12, the data processor 19, the encoder section 14 and the decoder section 15 is determined based on the time data from the STC 21.

Here, the decoder section 15 comprises: a separation section 15a for separating the main picture data, the sub-picture data and the speech data from the data read from the optical disk 11 by the disk drive 12 and input via the data processor 19; a memory 15b used at the time of executing separation processing in this separation section 15*a* and other signal processing; a decoder group 15*c* consisting of a V decoder for decoding the main picture data separated by the separation section 15*a*, an SP decoder for decoding the sub-picture data separated by the separation section 15*a* and an A decoder for decoding the speech data separated by the separation section 15*a*; and a video processor 15*d* for properly synthesizing the sub-picture data obtained from the SP decoder with the main picture data obtained from the V decoder, and overlapping the sub picture on the main picture for displaying.

The output of the video processor 15*d* is input to a video mixer 24. This video mixer 24 performs synthesis of the text data. To the video mixer 24 is connected a line for directly taking in the signal from the above-described A/V input section 17 and the TV tuner 18. To the video mixer 24 is also connected a frame memory 25 used as the buffer.

In the case where the output of the video mixer 24 is a digital output, it is output to the outside via an I/F (Inter/Face) 26, and in the case where the output of the video mixer 24 is an analog output, it is output to the outside via a DAC (Digital to Analog Converter) 27.

Moreover, in the case where the output of the above-described A decoder is a digital output, it is output to the outside via an I/F 28, and in the case of an analog output, the output is converted to analog by a DAC 30 via a selector 29, and output to the outside.

When the output signal from the A/V input section 17 and the TV tuner 18 is directly monitored by a select signal from the microcomputer block 16, this selector 29 can select the output from the ADC 14*a*.

[Characteristics of the Image Reproducing Apparatus]

The structure of the image reproducing apparatus according to the present invention is as described above. In this image reproducing apparatus having such a structure, the skip function of a commercial or the like in accordance with the actual situation, which is proposed by the present invention, will now be described in detail, using a flowchart. FIG. 2 is a flowchart showing a procedure for determining the skip time of the skip function of the image reproducing apparatus according to the present invention.

Conventional commercial (hereinafter referred to as CM) skip of the image reproducing apparatus of the DVD stands for a function of reproducing a recorded TV program with the CM being skipped, for example, when a CM skip key in a remote control 22 or the like is pressed once, the program is skipped to 30 seconds ahead and then reproduced. When the CM skip key is pressed twice, the program is skipped to 1 minute ahead and then reproduced. Hereafter, the skip destination of the reproduced picture is determined in proportion to the number of times the CM skip key is continuously pressed.

However, at first, since the user presses the CM skip key after having recognized that the CM has started during watching the picture, a delay in pressing the key occurs, including the time for taking up the remote control. Therefore, if the key is pressed twice at a portion where there is a CM for 1 minute, the point of time when reproduction starts at the skip destination becomes a point of time when several seconds has passed since the CM finished and the main program started. Hence, such a problem often occurs that a part of the main program after the CM is missed. The present invention is a skip function minutely corresponding to this problem, wherein a skip amount control section is provided in the above-described microcomputer block 16, to correct the delay time in the user's operation to avoid a case where a part of the main program is missed.

The image reproducing apparatus according to the present invention is for taking in the picture signal from the TV tuner 16 and the A/V input section 17 provided therein and recording the picture signal on the mounted optical disk 11 such as a DVD or the like, in the structure described above. This recording processing is also performed with respect to the built in HDD section 13.

In the similar manner, the image information and picture information stored in the optical disk 11 such as a DVD or the like and the HDD section 13 are reproduced under control of the microcomputer block, in accordance with the operation signal from the key input section 22 such as the operation panel or the remote control. The skip operation is instructed during this reproduction processing, and the procedure thereof will be described with reference to the flowchart of FIG. 2.

When the picture information is being reproduced, it is monitored whether the skip key on the key input section 22 such as the operation panel or the remote control is pressed or not (S11). If the key is pressed, it is judged whether or not the key is pressed continuously from the previous pressing of the skip key, that is, for example, the key is pressed within 3 seconds from the previous pressing (S12). Since CMs are usually provided in a unit of 15 seconds or 30 seconds, if it is a CM of 30 seconds, by pressing the skip key once, the CM can be skipped, and if it is a CM of 60 seconds, by pressing the skip key twice continuously (accurately speaking, here the key is pressed second time without the passage of 3 seconds or more), the CM can be skipped, and if it is a CM of 90 seconds, by pressing the skip key three times continuously, the CM can be skipped.

If the skip key is pressed first time, the time obtained by removing, from the CM time, the delay time until the user recognizes that the CM started during watching the picture, takes up the remote control 22 and actually presses the skip key, that is, as one example, the skip time of 27 seconds obtained by subtracting 3 seconds as the delay time from 30 seconds of the CM time is given herein, and the reproduction processing is interrupted and a skip for 27 seconds is performed (S13). In this manner, by performing the skip processing, taking the delay time into consideration, there can be avoided such a problem, which the conventional device tends to have, that since the user's operation is delayed by one tempo, the skip destination becomes a point of time when a little time period has passed since the CM finished, thereby a part of the main program is missed.

Moreover, by the judgment in step S12, if the skip key is pressed within 3 seconds since the previous pressing, it can be considered that the skip key has been pressed several times continuously in order to skip a CM time longer than 30 seconds. In principle, for the skip time with respect to pressing of the skip key second time and after, it is not necessary to take the delay time into consideration, like the first time, and hence, for example, 30 seconds, which can be considered to be the unit time of the CM, is designated as the skip time.

However, at the time of second skip processing, there may be a case where the previous skip processing has finished and reproduction has started. In such a case, there is a possibility that the operation timing of the user is somewhat delayed due to watching of reproduction, and there is a risk again that a part of the main program may be missed, since the timing of the skip destination is shifted behind.

Therefore, in step S14, it is confirmed whether reproduction has been started or not after the previous skip processing, and if not, the skip processing for 30 seconds is performed for the CM time where no delay is taken into consideration (S15). However, if reproduction after the previous skip processing has been started, in order to compensate the delay by this reproduction, for example, skip processing for 29 seconds is performed, subtracting, for example, one second as the delay time (S16).

In this manner, by dividing into several situations, the skip processing for optimum skip time corresponding to the situation is performed repeatedly, in response to pressing of the skip key. However, in the case where the reproduction processing of the image is suspended or stopped, the subroutine of the skip processing is also finished (S17).

The skip time at this time will be described in more detail. That is to say, when the user pressed the CM skip once, using the skip key of the remote control 22 or the like, the time for the CM skip is set to a certain period of time, 28 seconds. When this skip key is pressed twice, it is set to 58 seconds, by adding 30 seconds thereto, different from the skip time when the skip key is pressed once. At the third time and after, the time obtained by adding 30 seconds thereto, different from the skip time when the skip key is pressed once, is set as the skip time.

That is to say, the skip is performed; in the case of pressing the skip key once, 28 seconds, in the case of pressing the skip key twice continuously, 28+30=58 seconds collectively, in the case of pressing the skip key three times continuously, 28+30+30=88 seconds collectively, and by the similar calculation, the skip time is determined by the skip amount control section in the microcomputer block 16. At the point of time when there is no continuous pressing within 3 seconds, the count is reset, and pressing thereafter is handled as the first pressing.

Accordingly, in such skip processing, for example, 00:00:00 is designated as the reference point (the first key pressing point),
1) with the first pressing of the skip key (without waiting 3 seconds), skip processing to 00:00:28 is started immediately;
2) if the skip key is pressed again within 3 seconds after the first pressing;
2-1) if there is no picture appeared at this point of time, the skip operation to 00:00:58 is resumed; and
2-2) if a picture appeared at this point of time, the access operation to 00:00:57 is started. Here, in 2-2), the reason why one second is less than 2-1) is that, as described in step S15, there is high possibility that the user's reaction is delayed a little, due to watching this picture. Needless to say, it is also possible to use a method where 1 second is not reduced.

One example of the skip processing according to the present invention has been described above. There can be considered various modifications in relation to this case, which will be described below. For example, in the above embodiment, the description has been made of a case where the unit time of the skip processing is 30 seconds. However, in general, a CM is often in a unit of 15 seconds, or a multiple thereof. Therefore, it is also desired to perform a skip in a unit of 15 seconds. Hence, skip with respect to the first pressing is considered to be 12 seconds, and 15 seconds for the second pressing.

In the above example, the skip amount for the first pressing is designated as 27 seconds, but this time can be considered in a range of from 25 seconds to 29 seconds. This skip amount can be freely set by the user, using the remote control 22. As the setting in this case, it is possible for the user to freely set, through the remote control, the skip amount of the second time and after, in addition to the first skip amount, and the skip amount in the case where the skip is completed during the continuous input (the skip amount in step S16).

It is also desirable to automatically set the skip time, based on the information from the outside. For example, it is a case where the skip time is automatically set based on the program information or the like.

Furthermore, there can be used a method in which the display screen during the skip processing is made to be a hold screen, where the screen immediately before the skip is stopped and held, to thereby exclude the information of the CM screen other than the main program. It is also possible to make the display screen during the skip processing a blue back screen or the like, to thereby obtain the similar operation effect.

Lastly, in the above embodiment, the CM skip function has been described as an example, but the present invention is not limited to the CM skip, and it is a matter of course that the present invention has the similar effects, even if the present invention is adapted to a simple skip processing.

As described above, according to the present invention, there can be provided an image reproducing apparatus having a skip function in which there is little possibility that the opening portion of the main program after the CM is missed, even if a delay time occurs at the time of actually pressing the skip key of a remote control or the like, after the user recognizes that CM has started.

What is claimed is:

1. An image reproducing apparatus reproducing image information from a recording medium, comprising:
   a reproduction processor configured to reproduce the image information stored in the recording medium;
   a key input section having a skip key;
   a first skip processor configured to cause skipping, when the skip key is pressed a first time, the reproduction of the image information by the reproduction processor for a first predetermined period that takes into account a delay in the first time pressing of the skip key and resuming the reproduction of the image information by the reproduction processor after the first predetermined period has elapsed; and
   a second skip processor configured to cause skipping, when the skip key is pressed two times within a certain period, of the reproduction of the image information by the reproduction processor for the first predetermined and the second predetermined period, which is longer that the first predetermined period, and resuming the reproduction of the image information by the reproduction processor after the first predetermined and the second predetermined period have lapsed,
   wherein the first predetermined period is shorter than the second predetermined period by 1 to 5 seconds.

2. An image reproducing apparatus reproducing image information from a recording medium, comprising:
   a reproduction processor configured to reproduce the image information stored in the recording medium;
   a key input section having a skip key;
   a first skip processor configured to cause skipping, when the skip key is pressed a first time, the reproduction of the image information by the reproduction processor for a first predetermined period that takes into account a delay in the first time pressing of the skip key and resuming the reproduction of the image information by the reproduction processor after the first predetermined period has lapsed; and a second skip processor configured to cause skipping, when the skip key is pressed two times within a certain period, of the reproduction of the image information by the reproduction processor for the first predetermined period and a second predetermined period, which is longer that the first predetermined period, and resuming the reproduction of the image information by the reproduction processor after the first predetermined period and the second predetermined period have lapsed, wherein the first predetermined period is shorter that a predetermined multiple of 15 seconds by 1 to 5 seconds, and the second predetermined period is a predetermined multiple of 15 seconds.

3. An image reproducing apparatus reproducing image information from a recording medium, comprising:
- a reproduction processor configured to reproduce the image information stored in the recording medium;
- a key input section having a skip key;
- a first skip processor configured to cause skipping, when the skip is pressed a first time, the reproduction of the image information by the reproduction processor for a first predetermined period that takes into account a delay in the first time pressing of the skip key and resuming the reproduction of the image information by the reproduction processor after the first predetermined period has lapsed; and
- a second skip processor configured to cause skipping, when the skip key is pressed two times within a certain period, of the reproduction of the image information by the reproduction processor for the first predetermined period, and resuming the reproduction of the image information by the reproduction processor after the first predetermined period and the second predetermined period have elapsed, wherein the first predetermined period is in the range of about 25 seconds to about 29 seconds, and the second predetermined periods is 30 seconds.

* * * * *